US007503032B2

(12) United States Patent
Bhaskaran et al.

(10) Patent No.: US 7,503,032 B2
(45) Date of Patent: Mar. 10, 2009

(54) METHOD AND FRAMEWORK FOR MODEL SPECIFICATION, CONSISTENCY CHECKING AND COORDINATION OF BUSINESS PROCESSES

(75) Inventors: Kumar Bhaskaran, Englewood Cliffs, NJ (US); Guillermo Gallego, Ridgewood, NJ (US); Ying Huang, Yorktown Heights, NY (US); Ying T. Leung, Tarrytown, NY (US); Nitin R. Nayak, Ossining, NY (US); Sanjay E. Ramaswamy, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 09/881,024

(22) Filed: Jun. 15, 2001

(65) Prior Publication Data

US 2002/0194039 A1 Dec. 19, 2002

(51) Int. Cl.
*G06F 9/44* (2006.01)
(52) U.S. Cl. .......................... 717/104; 717/105; 705/7; 705/10
(58) Field of Classification Search ......... 717/100–162; 713/176, 175; 705/10, 7; 707/1
See application file for complete search history.

(56) References Cited

U.S. PATENT DOCUMENTS

| 6,199,195 | B1 * | 3/2001 | Goodwin et al. ............. 717/104 |
| 6,442,748 | B1 * | 8/2002 | Bowman-Amuah ......... 717/108 |
| 6,601,234 | B1 * | 7/2003 | Bowman-Amuah ......... 717/108 |
| 6,618,852 | B1 * | 9/2003 | van Eikeren et al. ........ 717/108 |
| 6,662,355 | B1 * | 12/2003 | Caswell et al. .............. 717/103 |
| 6,789,252 | B1 * | 9/2004 | Burke et al. ................. 717/100 |
| 6,867,789 | B1 * | 3/2005 | Allen et al. .................. 715/744 |
| 2002/0069083 | A1 * | 6/2002 | Harter et al. ..................... 705/1 |
| 2002/0129345 | A1 * | 9/2002 | Tilden et al. ................. 717/162 |
| 2002/0157004 | A1 * | 10/2002 | Smith et al. ................. 713/176 |
| 2002/0169658 | A1 * | 11/2002 | Adler .......................... 705/10 |
| 2003/0023685 | A1 * | 1/2003 | Cousins et al. .............. 709/205 |
| 2004/0083463 | A1 * | 4/2004 | Hawley ....................... 717/140 |
| 2004/0205597 | A1 * | 10/2004 | Abjanic ....................... 715/513 |
| 2005/0149489 | A1 * | 7/2005 | Abjanic et al. ................. 707/1 |

* cited by examiner

*Primary Examiner*—Meng-Al T. An
*Assistant Examiner*—Mark P. Francis
(74) *Attorney, Agent, or Firm*—Whitham, Curtis, Christofferson & Cook, PC; Stephen C. Kaufman

(57) ABSTRACT

A computer implemented system analysis and design method for use in a complex business environment characterized by a set of tightly linked business processes captures in a framework a world view of a business decision and/or a business application software system. A world view is defined by business objectives, constraints, assumptions, data, and underlying model used in business decision and/or the application software system. The framework is used to specify and document each business decision and/or business application software system in the complex environment. A BDML (Business Decision Markup Language) is used to implement the framework for specifying the world view of a business decision and/or a business application software system. A BDML processor comprises a syntax processor that checks the syntax correctness and syntax consistency within an individual and between different documents written in BDML, a logic processor that checks logical consistency between different documents written in BDML, in terms of the business objectives, constraints, assumptions, data, and underlying model among the different documents, and a knowledge-based processor including a knowledge base of business decisions, common choices for their decision support models and commercially available decision support systems, the knowledge-based processor providing suggestions for a set of BDML documents to improve consistency using the knowledge base.

4 Claims, 7 Drawing Sheets

METHOD AND FRAMEWORK FOR MODEL SPECIFICATION, CONSISTENCY CHECKING AND COORDINATION OF BUSINESS PROCESSES

BACKGROUND OF THE INVENTION

1. Field of the Invention

The present invention generally relates to system analysis and design in a complex business environment characterized by a set of tightly linked business processes, such as a supply chain, and, more particularly, to a method and tool set to capture the world view embedded in each sub-system in an unambiguous language and to verify consistency along process flows.

2. Background Description

Current software development tool sets for modeling of business processes focus on capturing the flow of data in and out of each task (data flow), and the sequencing of tasks (work flow/process flow). A wide range of approaches, constructs, and tools for modeling processes at this level are available. The common objective is to capture all the data and process flow details needed to enable application software development. Details can be found in software engineering books (e.g., Craig Larman, *Applying UML and Patterns*, Prentice-Hall, 1998). Software engineering tools (e.g., Rational Rose, Visio) are also available.

Since most businesses have fragmented information systems and little basic support for business processes, this approach to software development has yielded significant benefit in enabling efficient capture of information for code development, and basic coordination in terms of data flow and sequence of work flow. However, ensuring information flow and the sequence of workflow is not sufficient for coordination of the decision making process. Coordination of the decision making at each node or activity point in the process flow happens only when there is a common understanding of the problem. A common understanding of the problem means a consistent view of the objectives, the constraints, and assumptions on data at each point. This becomes an increasingly important issue when considering the evolution of software in enterprises.

The basic infrastructure for coordinated workflow and data flow is now available through the use of enterprise resource planning (ERP) systems, such as offerings from SAP AG, workflow software, such as IBM MQSeries Workflow, or basic technology components for software integration such as Orbix from Iona Technology or IBM MQSeries. Enterprise resource planning systems typically have many modules covering different functions within a business or a supply chain and have built-in coordination or workflow functionality. Workflow software packages are those designed to be controllers that invoke other applications based on a user-specified business process. Basic technology components provides a framework and low level utility functions to allow different applications or software modules communicate (synchronously or asynchronously). Users can use these components for building customized application bridges.

Software systems have advanced from automating transaction processing to enabling decision support. As more tactical decision making is automated, a certain "world view" relevant for the decision becomes encoded in the software. Each world view involves an abstraction and understanding of the input (input data flows for the process), a representation of the objectives, and the operating constraints and underlying assumptions. In addition, algorithmic knowledge to make decisions that best satisfy objectives also becomes encoded in software at each step of the process. Since a variety of software systems are used in each process, the coordination of these systems becomes essential. The first step in such coordination is to capture the world view embedded in each sub-system in an unambiguous language. The second step is to verify consistency along process flows.

A wide range of literature in the area of systems modeling, decision support systems, operations research, artificial intelligence, and software engineering was reviewed.

First, we consider the field of operations research which deals with quantitative modeling of business problems. A complex business environment characterized by a set of related business processes such as a supply chain can often be modeled quantitatively by a large scale mathematical program consisting of an objective and a set of constraints. Mathematical programming is a very powerful and well researched approach to problem solving. Several companies provide tools that are based on math programming solvers, and a modeling language for problem representation as a front-end. Examples are AMPL (Robert Fourer, David M. Gay, Brian W. Kernighan, *AMPL: A Modeling Language for Math Programming Package*, Brooks/Cole, 1999) and GAMS (Anthony Brooke, David Kendrick, Alexander Meerhaus, *Release* 2.25 *GAMS: A User's Guide*, Scientific Press, 1992). A typical mathematical programming language is an algebraic modeling language that is easy for the user to specify objectives and constraints in a form that the solver can understand. However, this is also the problem—the constructs of the language are limited to what the solver can use, and the focus of the modeling is on the specialized application of mathematical optimization which is but an isolated step in the overall business process. Thus, we have languages that specify objectives and constraints as deterministic variables (the randomness of variables cannot be specified) for the purpose of a mathematical programming solver. In "General-Purpose Modeling Languages for Combinational Optimization" by R. Fourer, *AMPOD '98*, Limassol, Cyprus, Mar. 11, 1998, an extension of an optimization modeling language to include additional operators, and subsequently solution techniques or solvers that can handle such operators is described. Even then we have languages that allow a restricted set of characterizations of randomness that are acceptable to the stochastic solvers they are coupled with. For our proposed tool, we needed a language that is not restricted by the solution method, and general enough to capture problem understanding in a manner suitable for consistency checking.

Computer simulation languages on the other hand provide a more general set of constructs similar to most computer programming languages. Building a model with these languages entails a complete specification of process, data, and algorithmic logic. Again, a variety of languages from different vendors are available, some specialized for certain applications, others more general in nature. SIMAN (C. Dennis Pegden, Robert E. Shannon, and Randy P. Sadowski, *Introduction to Simulation Using SIMAN*, $2^{nd}$ edition, McGraw-Hill, 1995) and GPSS (Thomas J. Schriber, *An Introduction to Simulation Using GPSS/H*, $2^{nd}$ edition, John Wiley, 1991) are examples of general purpose simulation languages for any discrete event systems, while PROMODEL (Charles Harrell, Birman K. Ghosh, Royce Bowden, Simulation Using promodel, McGraw-Hill, 2000) is an example of a more specialized language for manufacturing system applications. From our perspective, we are not interested in modeling the evolution of a physical process over time, but are interested in the representation of the understanding of a business problem implied by a software system.

Systems modeling languages such as petri-nets also seek to provide system specifications in a manner amenable to analysis of the process flows. Other discrete event system modeling languages and techniques for their analysis are described in *Modeling and Control of Logical Discrete Event Systems* by Ratnesh Kumar and Vijay K. Garg, Kluwer Academic Publishers, 1995. Similar to computer simulation languages, these systems modeling languages are designed to model the dynamic behavior of a discrete event system over time. They also provide the capability for the user to analyze the system in aspects other than performance evaluation, such as deadlock prevention or automatic control. Again, the invention seeks to complement such modeling tools/languages by adding the missing piece on the flow of understanding in a set of software systems.

Software engineering is an area that offers a variety of languages and tools for modeling process and data flows and constructing software systems. UML (Unified Modeling Language) is an example of a language for specifying, visualizing and constructing the artifacts of software systems. It is a notational system aimed at modeling systems using object oriented concepts. Details about this and other approaches can be found in Craig Larman, supra. These languages are designed to capture the detailed mechanics of a software system, such as the operational relationship between different program objects, assuming that the user already has an understanding of what the system is supposed to do. The invention focuses on specifying what the software system has to do and how to perform it algorithmically or mathematically.

U.S. Pat. No. 5,167,012 to Hayes et al. for "Method for Performing Consistency Checks" is directed to a method for examining a previously consistent state of a rule based expert system after a change is made to a rule or a variable. This is primarily to ensure logical consistency in rule based expert systems whereas our proposed invention deals with process or data flow consistency in business processes.

U.S. Pat. No. 5,446,830 to Crawford, Jr. et al. for "Efficient Non-Monotonic Reasoning Apparatus and Methods" describes a method employed in reasoning systems to approximately determine whether a given fact about one or more objects is consistent with the knowledge base. Again, this is a very specific method employed in any general reasoning system, while our invention is a framework and method for business processes. A technique such as that described in the above patent may or may not find applicability as a way to accomplish a subset of the activities within our proposed method.

U.S. Pat. No. 5,845,258 to Kennedy for "Strategy Driven Planning System and Method of Operation" uses a plan defining a scheduled operation of a user, and a link from strategy to plan. Automatic strategy selection and a planning engine that compares plan to strategy are the focus of this invention. No links with business process flow, data flow, or issues of consistency in flow within a process are dealt with.

U.S. Pat. No. 5,587,935 to Brooks et al. for "Integrated Software Development System Including Group Decision Support Subsystem, Application Subsystem, and Bridge Subsystem Therebetween" discloses an integrated system for creating a process model and writing software based on the process model. The group decision support module is used to create and order the process model according to a protocol. The application development module is used for writing software based on the output of the previous module, and the bridge converts the output of the group decision support subsystem to compatible input for the application development subsystem. The decision support module referred to in this patent is defined to comprise means for exchanging ideas, comments, voting means, etc. to facilitate better software development. Our invention is different in that it deals with process specific decision making, and software that encodes business decision making knowledge; i.e., not decision support for software development, but operational decision making for running a business. Such operational decision making is encoded in software modules as described in previous sections. Our invention can therefore complement the methods described in this disclosure.

U.S. Pat. No. 5,490,097 Swenson et al. for "System and Method for Modeling, Analyzing, and Executing Work Process Plans" defines a method to model work processes, tasks and their sequential or other relationships with each other. It includes methods for tracking the progress and completion of activities. It is used for process modeling that forms an input to our tool.

U.S. Pat. No. 4,658,370 Erman et al. for "Knowledge Engineering Tool" is a tool for building and interpreting a knowledge base. It has methods for storing knowledge and an inference engine. This is a variation of a general purpose expert system.

U.S. Pat. No. 5,233,513 to Doyle for "Business Modeling, Software Engineering and Prototyping Method and Apparatus" describes a program that is useful for creating a business model by analysis of process, data, control, and support. Also, it generates application programs by expert system manipulation of data defining the business model. This is a tool for generating application software and is complementary to our proposed invention. For example, the application software generated can be the subject of analysis, i.e., input, of our invention.

SUMMARY OF THE INVENTION

According to the invention, there is provided a framework and method for the capturing of problem understanding and consistency checking among the many business process steps in a complex environment such as a supply chain, independent of the actual solution techniques, algorithms, or implementation method used. In fact, some process steps may not even involve decision support software, but instead be a judgment decision by a human. In addition to the problem understanding, the invention also captures the methods by which decisions are made (i.e., the algorithms used) and information on the specific implementation used. The invention serves as:

a) a method to help check the logical consistency of objectives, constraints, assumptions, data, and underlying model between different business processes or process steps;

b) a method to help check the logical consistency of objectives, constraints, assumptions, data, and underlying model between different application software systems or software modules within a system used to support the business processes;

c) a method to enable communication between different application software systems or software modules within a system beyond data exchanges, at the logical or model level;

d) a method to document clearly the decision problems and their solutions encountered in business processes;

e) a method to complement existing software development tools which document process and data flows and program object relationships to provide a complete documentation of a set of business processes and/or business application software systems;

f) a method to specify the business function of an application software module or system in machine readable form; and g) an unambiguous and unified set of notation and terminology for technical publications related to business processes.

Applications of this invention include, but are not limited to:

a) coordination of different steps and/or different organizations involved in a single business process so that they work together towards a single business goal;

b) design, diagnosis, and fine tuning of a supply chain or any business process within an organization or across organizations, such as the identification of missing links;

c) design of performance measures within a single business process or across different business processes;

d) integration and configuration of application software modules or systems to support a complex business environment such as a supply chain;

e) design of interfaces between application software modules or systems, especially between systems from different vendors;

f) exchange of decision model and data between organizations in a collaborative business environment;

g) documentation of the functional and implementation aspects of a business process and/or application software systems supporting a business process, as a means of managing and retaining the collective knowledge of an organization;

h) publication of the functional specification of application software systems at different levels of detail for system administrators, application developers, system analysts, and end users;

i) creation and maintenance of an industry-wide database of business application software systems for potential system buyers and users; and j) creation and maintenance of a database of technical research literature on business decisions (such as those in management science, operations research, operations management) for technical researchers, consultants, and business users.

This invention consists of two key components:

1. A framework for specifying the understanding or world view of a business decision embedded in a process step and/or a business application software system supporting a process step, given in the form of a business decision markup language (BDML). A world view is defined by the business objectives, constraints, assumptions, data, and underlying model used in the business decision and/or the application software system. Using this framework each business decision and/or business application software system in a complex environment such as a supply chain can be specified by a BDML document. Constructs in BDML are designed to support quantitative and logical elements. A preferred implementation will be in XML (eXtensible Markup Language).

2. A tool to automatically check the logical consistency between different documents written in BDML. This tool takes as input a user specified set of BDML documents in electronic form and provides the following as output:

(a) reports on inconsistency (if any) of the business objectives, constraints, assumptions, data, and underlying model among the different documents; and (b) suggestions (if needed) to improve consistency based on stored knowledge of similar business decisions and popular choices for their decision support models.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
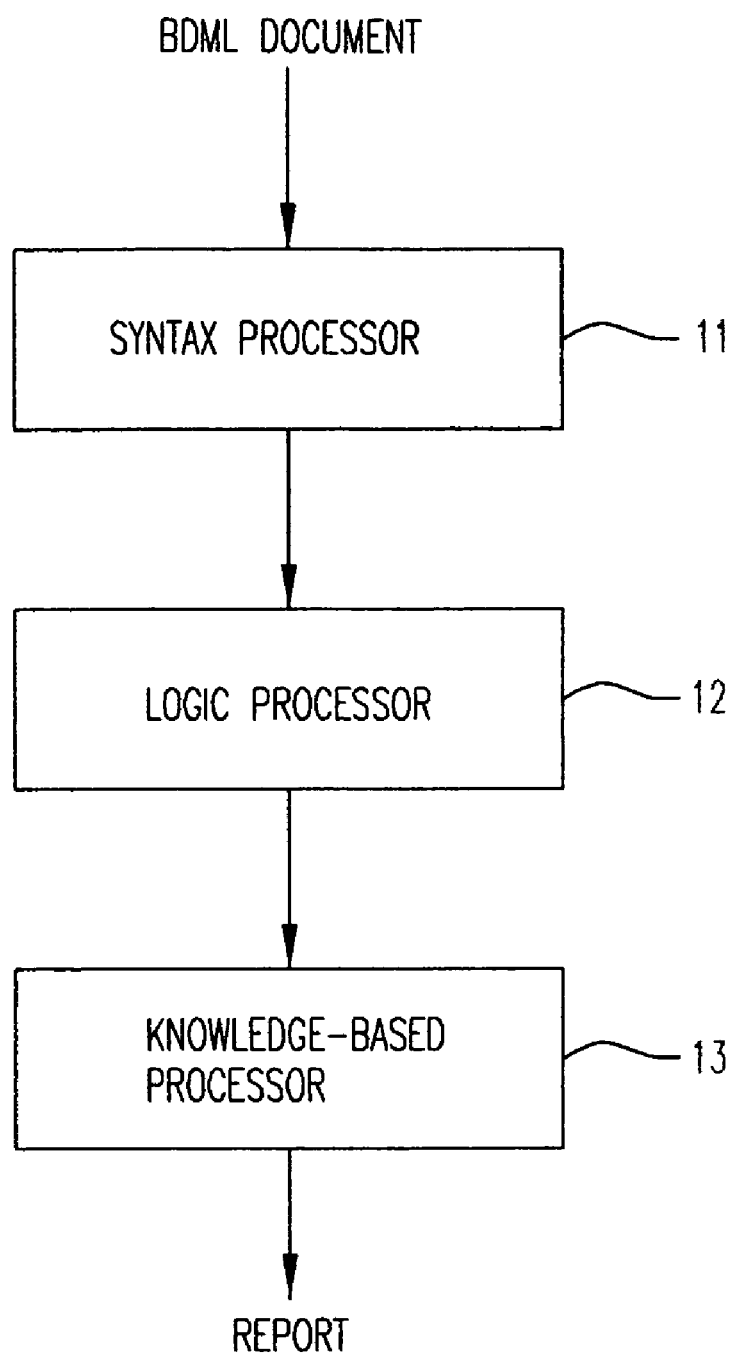
FIG. 1 is a schematic diagram showing the components of the BDML processor.

We now describe a preferred implementation of a BDML system. Such a system is composed of two components:

1. a BDML (Business Decision Markup Language) that implements the framework for specifying the world view of a business decision and/or a business application software system; and 2. a BDML processor that implements the tool to automatically check the logical consistency between different documents written in BDML.

The BDML system is used in the following way. A business decision (BD) embedded in a process step in a business process or a business application software system to support a BD is specified by a BDML document. The BDML document is created by a human based on the understanding of the business process and/or the application software. For an application software system, the corresponding BDML document(s) can be published by the vendor, together with the user's manual. Then, for a business process with a number of steps or business decisions, we have a corresponding set of BDML of documents. These documents are fed into a BDML processor for consistency checking.

BDML is based on XML (eXtensible Markup Language) and its tags are defined following the XML tag definition standards. In a BDML document, there are needs to describe variables and logical relationship between variables, such as logical descriptions of objectives, assumptions, constraints, and algorithms. Such are described in a syntax that are Java-compliant. This facilitates machine understanding of the contents of the objectives, assumptions, constraints, and algorithms. A BDML document for a business decision or process also contains user findings, experiences, and insights with the underlying models, so that it can serve as a data point in a knowledge base. The knowledge base is used by the BDML processor to recommend any actions necessary to correct inconsistencies found in the BDML documents.

A BDML document consists of three types of files: one for the BD itself, one for the model specification, and one for the implementation of the BD. We specify the key tags used in the three files in a BDML document in the following. In the specification of each tag, we specify whether the tag is mandatory, optional, or multiple. "Multiple" means that the tag can occur multiple times to denote several different instances of the same tag type.

The Business Decision File

The tags for the BD can be divided into the following sections:
1. Preamble
2. Decision Composition
3. Business Process In the Preamble (TAG: <BDInfo>) section, the following TAGS are defined:
  a. Name (TAG: <BDName>): defines the name of the business decision. Mandatory.
  b. Identification (TAG: <BDID>): defines a unique identifier for the business decision. It should be of numeric type. Mandatory.
  c. Type (TAG: <BDType>): defines the type of the business decision, for example, "FORECASTING", "REPLENISHMENT", "PRODUCTION PLANNING", "PRODUCTION SCHEDULING", "SHIPPING", etc. The types are user defined. Mandatory.
  d. Date (TAG: <Date>): defines the last modified date of the business decision file. Optional.
  e. Owner (TAG: <BDOwner>): defines the owner of the business decision. Optional.

In the Decision Composition (TAG: <BDComposition>) section, the following TAGS are defined:
  a. Description (TAG: <BDDescription>): describes the business decision in textual form. There are three TAGS under <BDDescription>:
     Objective (TAG: <DescriptionObjective>): defines the objective of the business decision in textual form. Mandatory.
     Assumption (TAG: <DescriptionAssumption>): defines an assumption of the business decision in textual form. Optional/multiple.
     Constraint (TAG: <DescriptionConstraint>): defines a constraint of the business decision in textual form. Optional/multiple.
  b. Model (TAG: <BDModel>): provides the logic and textual description of the model used for the decision composition. The definition of the model is contained in a separate file (i.e., models can exist independently and do not have to be associated with a decision). Therefore, only <ModelName> and <ModelID> are required here to identify the model to be used.
     Name (TAG: <ModelName>): defines the name of the model. Mandatory.
     Identification (TAG: <ModelID>): defines a unique identifier for the decision model. It can be used later for the retrieval of the model. Mandatory.

In the Business Process (TAG: <BDProcess>) section, the following TAGS are defined:
  a. Activity Name (TAG: <ActivityName>): identifies the name of the activity in the corresponding workflow model of the business process(es) involving the business decision. Optional.
  b. Activity Identification (TAG: <ActivityID>): defines a unique identifier for the activity in the corresponding workflow model of the business process(es) involving the business decision. Optional.
  c. Role (TAG: <ActivityRole>): describes the role of the activity in the corresponding workflow model of the business process(es) involving the business decision. Optional.
  d. Predecessor Activity Identification (TAG: <PreActivityID>): specifies the identifier of the predecessor activity of the present activity. Optional/multiple.
  e. Successor Activity Identification (TAG: <SucActivityID>): specifies the identifier of the successor activity of the present activity. Optional/multiple.
  f. Parent ID (TAG: <ActivityParent>): specifies the identifier of the parent activity of the present activity in a hierarchical relationship. Optional/multiple.
  g. Child ID (TAG: <Activity Child>): specifies the identifier of the child activity of the present activity in a hierarchical relationship. Optional/multiple.

Note that using the information provided in the <BDProcess>, one can reconstruct the overall business decision flow.

The Model File

The model is identified using the <BDModel> tag in the Business Decision file described above. The tags for the model file can be divided into the following sections:
  a. Preamble
  b. Model
  c. Data
  d. Findings In the Preamble (TAG: <ModelInfo>), the following tags will be defined:
  a. Name (TAG: <ModelName>): defines the name of the decision model. Mandatory.
  b. Identification (TAG: <ModelID>): specifies the unique identifier for the decision model. The identifier can be used later for the retrieval of the model. (The description of the model can be kept in a separate file.) The identifier should be of numeric type. Mandatory.
  c. Type (TAG: <ModelType>): defines the type of the model, for example, "FORECASTING", "REPLENISHMENT", "PRODUCTION PLANNING", "PRODUCTION SCHEDULING", "SHIPPING", etc. Mandatory.
  d. Date (TAG: <ModelDate>): defines the last modified date. Optional.
  e. Owner (TAG: <ModelOwner>): defines the owner of the model. Optional.
  f. Predecessor Model Identification (TAG: <PreModelID>): specifies the identifier of the predecessor model of the present model. Optional/multiple.
  g. Successor Model Identification (TAG: <SucModelID>): specifies the identifier of the successor model of the present model. Optional/multiple.
  h. Parent ID (TAG: <ModelParent>): specifies the identifier of the parent model of the present model in a hierarchical relationship. Optional/multiple.
  i. Child ID (TAG: <Model Child>)

In Model (TAG: <BDModel>), the logic and textual description of the decision model composition is provided. All logical descriptions follow Java syntax:
  a. Objective (TAG: <ModelObjective>): defines the objective function of the model in logical and textual formats. Mandatory.
     Logic (TAG: <ModelObjectiveLogic>): provides a logical or mathematical expression for the objective.

Textual (TAG: <ModelObjectiveText>): provides a textual description for the objective.
b. Assumption (TAG: <ModelAssumption>): defines an assumption of the model in logical and textual formats. Optional/multiple.
  Logic (TAG: <ModelAssumptionLogic>): provides a logical or mathematical expression for the assumption.
  Textual (TAG: <ModelAssumptionText>): provides a textual description for the assumption.
c. Constraint (TAG: <ModelConstraint>): defines a constraint of the model in logical and textual formats. The number of constraints can be zero or many. Optional/multiple.
  Logic (TAG: <ModelConstraintLogic>): provides a logical or mathematical expression for the constraint.
  Textual (TAG: <ModelConstraintText>): provides a textual description for the constraint.
d. Algorithm (TAG: <ModelAlgorithm>): defines in logical and textual formats an algorithm to find a solution to the model. The tag must exist even though it may refer to an implementation in an existing or commercial tool (e.g., software products from i2, SAS, etc). Mandatory/multiple.
  Name (TAG: <ModelAlgorithmName>): defines the name of the algorithm.
  Identification (TAG: <ModelAlgorithmID>): specifies the unique identifier for the algorithm. The identifier is of numeric type.
  Logic (TAG: <ModelAlgorithmLogic>): provides a logical expression for the algorithm. The logical description of the algorithm uses a Java-based syntax.
  Textual (TAG: <ModelAlgorithmText>): provides a textual description for the algorithm.
e. Variable (TAG: <ModelVariable>): defines a variable in logical and textual formats. A variable contains a quantity that is computed by the model, although it can contain a starting value at the beginning of the algorithm. A model should have zero or more variables. Optional/multiple.
  Logic (TAG: <ModelVariableLogic>): provides a logical expression for the variable.
  Textual (TAG: <ModelVariableText>): provides a textual description for the variable.
f. Parameter (TAG: <ModelParameter>): define a parameter in logical and textual formats. A parameter contains a quantity that is used (but not computed) by the model. Its value is either specified by the user or computed by a model that is executed prior to the present one. A model should have zero or more parameters. An entity can either be a variable or a parameter according to the definition here, but not both. Optional/multiple.
  Logic (TAG: <ModelParameterLogic>): provides a logical expression for the parameter.
  Textual (TAG: <ModelParameterText>): provides a textual description for the parameter.

In Data (TAG: <BDData>), it defines the input/output data format for the business decision. The data should sufficiently meet the needs of the underlying model.
a. Input (TAG: <DataInput>): specifies the input data. This tag contains zero or more variables and parameters.
  Variable (TAG: <InputVariable>): describes an input variable. Optional/multiple.
    Logic (TAG: <InputVariableLogic>): specifies the input variable, as one of the variables defined in the <BDModel>/<ModelVariable>
    Value (TAG: <InputVariableValue>): specifies the input variable value.
  Parameter (TAG: <InputParameter>): describe the input parameter. Optional/multiple.
    Logic (TAG: <InputParameterLogic>): specifies the input parameter, as one of the parameters defined in the <BDModel>/<ModelParameter>
    Value (TAG: <InputParameterValue>): specifies the input parameter value.
b. Output (TAG: <DataOutput>): specifies the output data. The tag can contain zero or more variables.
  Variable (TAG: <OutputVariable>): describes an output variable. Optional/multiple.
    Logic (TAG: <OutputVariableLogic>): specifies the output variable, as one of the variables defined in the <BDModel>/<ModelVariable>
    Value (TAG: <OutputVariableValue>): specifies the default output variable value.

In Findings (TAG: <BDFindings>), the findings of the model are reported. The findings may include the run time, worst case performance, or the asymptotic behavior of the algorithm. This tag and all tags within the Findings section are optional.
1. Complexity (TAG: <ModelComplexity>): describes the computational complexity of the solution to the model. Choices are, for example, "WEAK NP-HARD", "STRONG NP-HARD", "POLYNOMIAL".
2. Algorithm Performance (TAG: <AlgorithmPerformance>):
  Algorithm Id (TAG: <AlgorithmId>): specifies the identifier of the algorithm for which this performance section is relevant.
  Run Time (TAG: <AlgorithmRunTime>): describes the run time in terms of parameters specified by the model.
  Solution Quality (TAG: <AlgorithmSolutionQuality>): describes the quality of the solution to the model, as obtained by the algorithm.
    Optimality (TAG: <AlgorithmOptimality>): describes whether the algorithm solves the model to optimality or not, i.e., whether the true optimum of the model is found by the algorithm. Choices are, for example, "OPTIMAL", "APPROXIMATE", "NOT APPLICABLE" for those models which do not involve optimization.
    Worst Case Bound (TAG: <AlgorithmWorstCaseBound>) describes worst case performance bound of the algorithm for those algorithms which finds an approximate solution.
    Average Case Bound (TAG: <AlgorithmAverageCaseBound>) describes average case performance bound algorithm for those algorithms which finds an approximate solution.
    Asymptotic Properties (TAG: <AlgorithmAsymptoticProperties>) describes whether the algorithm produces a solution that is asymptotically exact, and if so, with respect to which parameters.
3. Insights:
  Managerial (TAG: <ManagerialInsights>) describes managerial insights obtained through the analysis of the decision problem, if any.
  Technical (TAG: <TechnicalInsights>) describes technical insights obtained through the analysis of the problem, if any.
4. Known Issues: describes known but unresolved issues related to the model, which are potential topics for future research work.

Managerial (TAG: <KnownIssuesManagerial>) describes managerial issues related to the model.

Technical (TAG: <KnownIssuesTechnical>) describes technical issues related to the model.

The Implementation File

The tags for the Implementation file can be divided into the following sections:
 a. Preamble
 b. Program
 c. Data For the data files required the Implementation, we assume that they in XML format (either well-formatted XML documents or with associated Document Type Definitions (DTDs)). Data in other formats (flat text file, database or spreadsheet formats) should first be transformed to an XML format to be used by BDML. This should be in line with the overall trend in the information industry to standardize the data messaging formats to various XML standards (e.g., RosettaNet, Open Applications Group Business Object Document, etc.).

In the Preamble (TAG: <ImplementInfo>), the following TAGs will be defined:
 a. Name (TAG: <ImplementName>): defines the name of the implementation. For example, it can be the name of a home-grown or a commercially available system. Mandatory.
 b. Identification (TAG: <ImplementID>): specifies a unique identifier for the implementation. It should be of the numeric type. Mandatory.
 c. Model Identification (TAG: <ModelID>): specifies the model for which the implementation is developed. It should be of the numeric type. Mandatory.
 d. Algorithm Identification (TAG: <AlgorithmID>): specifies the algorithm for which the implementation is developed. It should be of the numeric type. Mandatory/multiple.
 e. Type (TAG: <ImplementType>): defines the type of the implementation. For example, the choices can be "INTERNAL", "ISV", "COMBINATION", etc.
 f. Date (TAG: <ImplementDate>): defines the last modified date of this implementation specification. Optional.
 g. Owner (TAG: <ImplementOwner>): defines the owner of the implementation. Optional.

In Program (TAG: <BDProgram>), the program that implements the decision model is described.
 a. Name (TAG: <ProgramName>): defines the name of the program of the implementation. Mandatory.
 b. Vendor (TAG: <ProgramVendor>): specifies the vendor that provides the program. Mandatory.
 c. Version (TAG: <ProgramVersion>): specifies the version of the program. Mandatory.
 d. Method (TAG: <ProgramMethod>): defines the method of invocation. If it is an API (Application Program Interface), then this will be name of the API and associated calling method. If it requires invoking more than one APIs/Programs, then the method will include the calling sequence by providing a set of suitable Java statements.
  Name (TAG: <MethodName>): defines the name of the method.
  Type (TAG: <MethodType>): defines the access type of the method. The types include "STANDALONE", "RMI", "CORBA", "MESSAGING", etc.
  Location (TAG: <MethodLocation>): defines the network location (e.g., URL (Universal Resource Locator)) for where the main implementation API/Program resides. The location information can also be associated with a directory service (e.g., an entity in an LDAP (Lightweight Directory Access Protocol)).

In Data (TAG: <BDDataForm>), the input/output data format for the implementation is described. The data specified should be sufficient to meet the needs of the implementation. The input/output information provided will be associated with the actual implementation rather than the logical definition as that in the <BDModel>/<BDData>.
 a. Input Source (TAG: <DataFormInputSource>): specifies the input data. The tag can contain zero or more input source.
  Name (TAG: <InputName>): describes the name of the input file and its associated DTD.
  Location (TAG: <InputLocation>): describes the location of the input file. The location can be an IP address, server and directory name, or URL, depending the type of the input source.
 b. Output Source (TAG: <DataFormOutputSource>): specifies the output data. The tag can contain zero or more output source.
  Name (TAG: <OutputName>): describes the name of the output file and its associated DTD.
  Location (TAG: <OutputLocation>): describes the location of the output file. The location can be an IP address, server and directory name, or URL, depending the type of the output source.

This completes the key specifications of BDML.

The BDML processor takes as input a set of user-specified BDML documents and produces as output a report on:
 1. inconsistency (if any) of the business objectives, constraints, assumptions, data, and underlying model among the different documents;
 2. suggestions (if needed) to improve consistency based on stored knowledge of similar business decisions and popular choices for their decision support models.

Referring now to the drawings, and more particularly to FIG. 1, the BDML processor consists of three parts that are executed in sequence: a syntax processor 11, a logic processor 12, and a knowledge-based processor 13. The syntax processor 11 checks that all mandatory BDML tags exist in the document, performs consistency checks on BDML tags and the Java-based syntax of variables and logical descriptions. The syntax processor 11 is similar to a computer programming language compiler and is constructed using standard tools of the compiler trade (see, for example, Thomas Pittman and James Peters, *The Art of Compiler Design. Theory and Practice*, Prentice Hall, 1991). The knowledge-based processor 13 provides suggestions to the user to correct any logical inconsistencies found in the BDML document(s). The knowledge-based processor matches the inconsistencies found by the logic processor 12 with cases contained in a knowledge base and selects suggestions from the same knowledge base. This knowledge base contains business process scenarios that are commonly found and can be industry and context specific. For example, a knowledge base can be developed for a supply chain involving a retailer and multiple manufacturers that supply the retailer, or for the customer order fulfillment process of semiconductor manufacturers. The knowledge-based processor 13 is constructed using standard tools of the knowledge-based systems trade (see, for example, Cornelius T. Leondes (Editor), *Knowledge-Based Systems Techniques and Applications*, volumes 1-4, Academic Press, 2000).

The logic processor 12 is the contribution of this invention. Its purpose is to interpret the BDML tags and perform logical consistency checks of objectives, constraints, assumptions, data, and underlying models. To illustrate the underlying workings of the logic processor, we use an example of an important business process found in a retailer-manufacturer supply chain, namely a collaborative forecasting process. In this process, both the manufacturer (supplier of goods) and the retailer participate in the process of forecasting the sales of items at the retail end in order to come to a common understanding of the customer demand. A single set of forecast is then generated for both the retailer and the supplier, which drives the replenishment of goods. Using one common set of forecasts has tremendous benefits to both parties in terms of reducing the cost of subsequent replenishment of goods, and synchronizing their actions. For instance, a promotion plan by the retailer is known in advance to the supplier who either ensures adequate supply or informs the retailer about supply constraints. Such collaborative processes have been promoted by the Collaborative Planning, Forecasting and Replenishment (CPFR) Committee of the Voluntary Interindustry Commerce Standards Association (www.cpfr.org).

Figure 2:
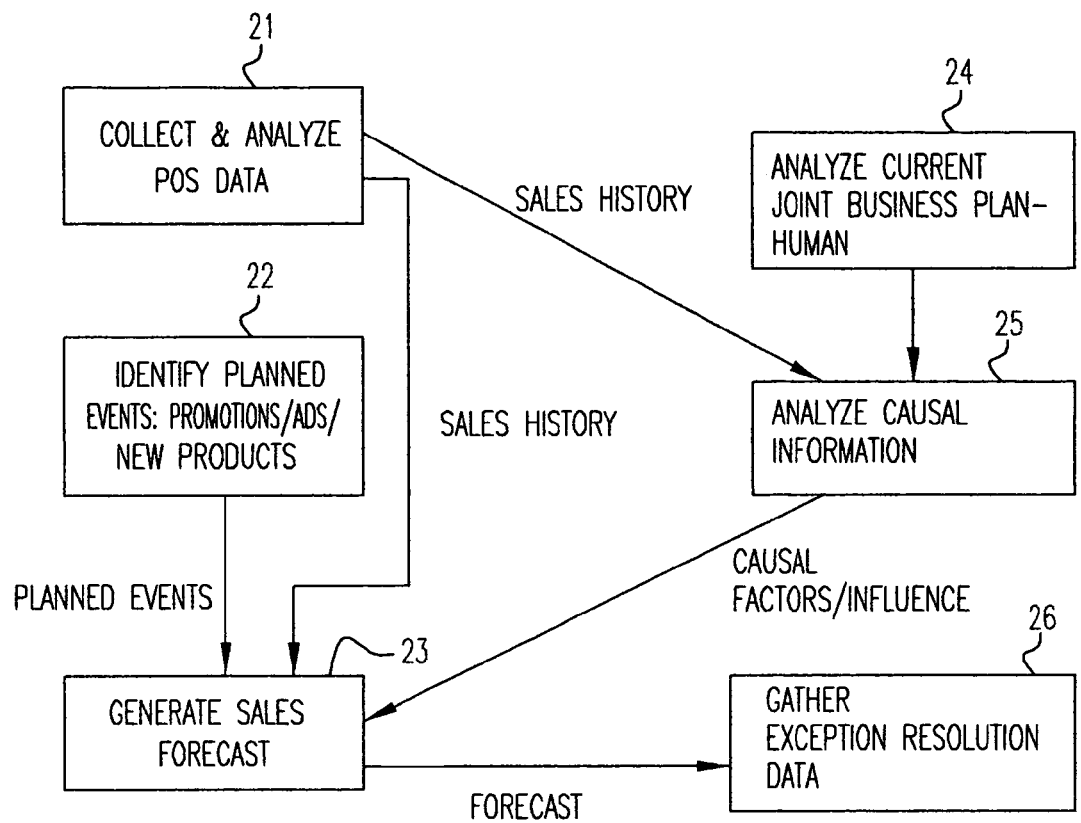
FIG. 2 is a process diagram showing a sales forecasting process.

FIG. 2 shows our example forecasting process. Each process step is represented by a block in the figure. This process follows the guidelines laid down by the CPFR Committee ("Collaborative Planning Forecasting and Replenishment Voluntary Guidelines," Voluntary Interindustry Commerce Standards Association, also presented on http://www.cpfr.org/Guidelines.html). Guidelines.html). In FIG. 2, block 21 collects and analyzes point-of-sale (POS) data, such as units sold by product in weekly buckets. Block 22 identifies planned future events that have significant effects on sales, such as product promotions through price markdowns, general advertisements in the media, or introduction of a new product through flyers or in-store displays. Block 23 generates a set of sales forecast by product by week for the planning horizon, typically the next twenty-six weeks. It uses historical POS data from block 21, information on future planned events from block 22, and estimated effects of causal factors from block 25. Block 24 analyzes the current business plan which has been jointly developed by both the retailer and manufacturer. This covers the comparison of the business plan to the current state of affairs in terms of revenue, profit, or market share and discussion of any action needed. Block 25 receives input from block 24 and uses the POS data and historical information from block 21 such as past events (similar to planned future events) to analyze the effect of causal factors on sales. Block 26 analyzes the sales forecast generated by block 23 and gathers the exception cases as defined by the criteria previously agreed to by both the retailer and manufacturer.

Figure 3:
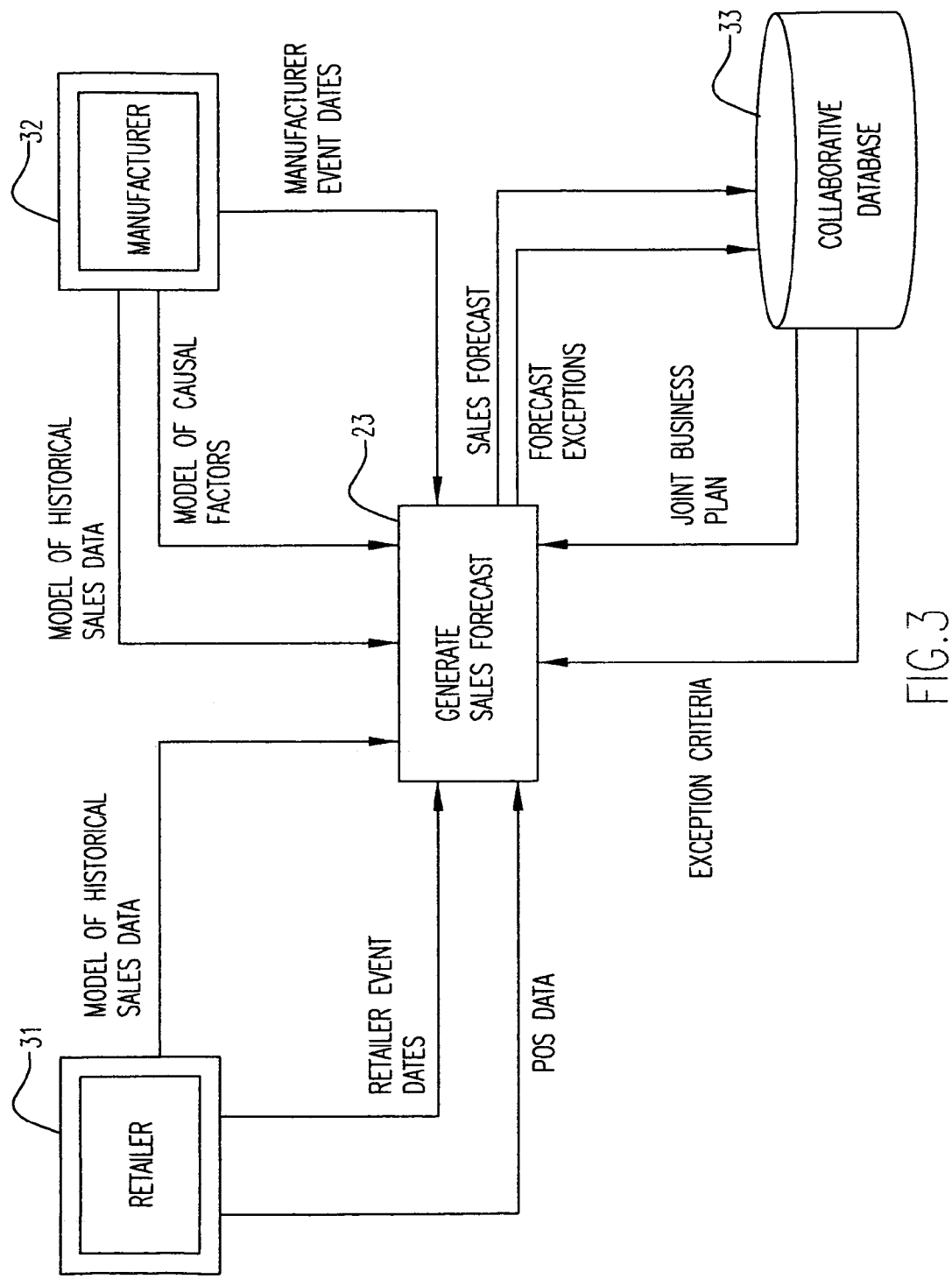
FIG. 3 is a data flow diagram for the sales forecasting process shown in FIG. 2.

FIG. 3 shows the main data flows into and out of block 23, generate sales forecast, of FIG. 2. Referring to FIG. 3, input data include those from the retailer 31: POS data, event dates for future events planned by the retailer such as product promotions through price markdowns or in-store displays, model of historical sales data which is the result of POS data analysis (block 21 in FIG. 2); those from the manufacturer 32: event dates for future events planned by the manufacturer such as new product introduction and manufacturer-sponsored product promotions, model of historical sales data which is the result of POS data analysis (block 21 in FIG. 2), model of causal factors that is the result of causal information analysis (block 25 in FIG. 2); and those from the collaborative database shared by the retailer and the manufacturer 33: the joint business plan and the forecast exception criteria previously agreed to by the retailer and manufacturer. The output data are the sales forecast by product by week and the forecast exceptions identified according to the exception criteria. These outputs go to the collaborative database to be used by the retailer 31 and manufacturer 32.

Figure 4:
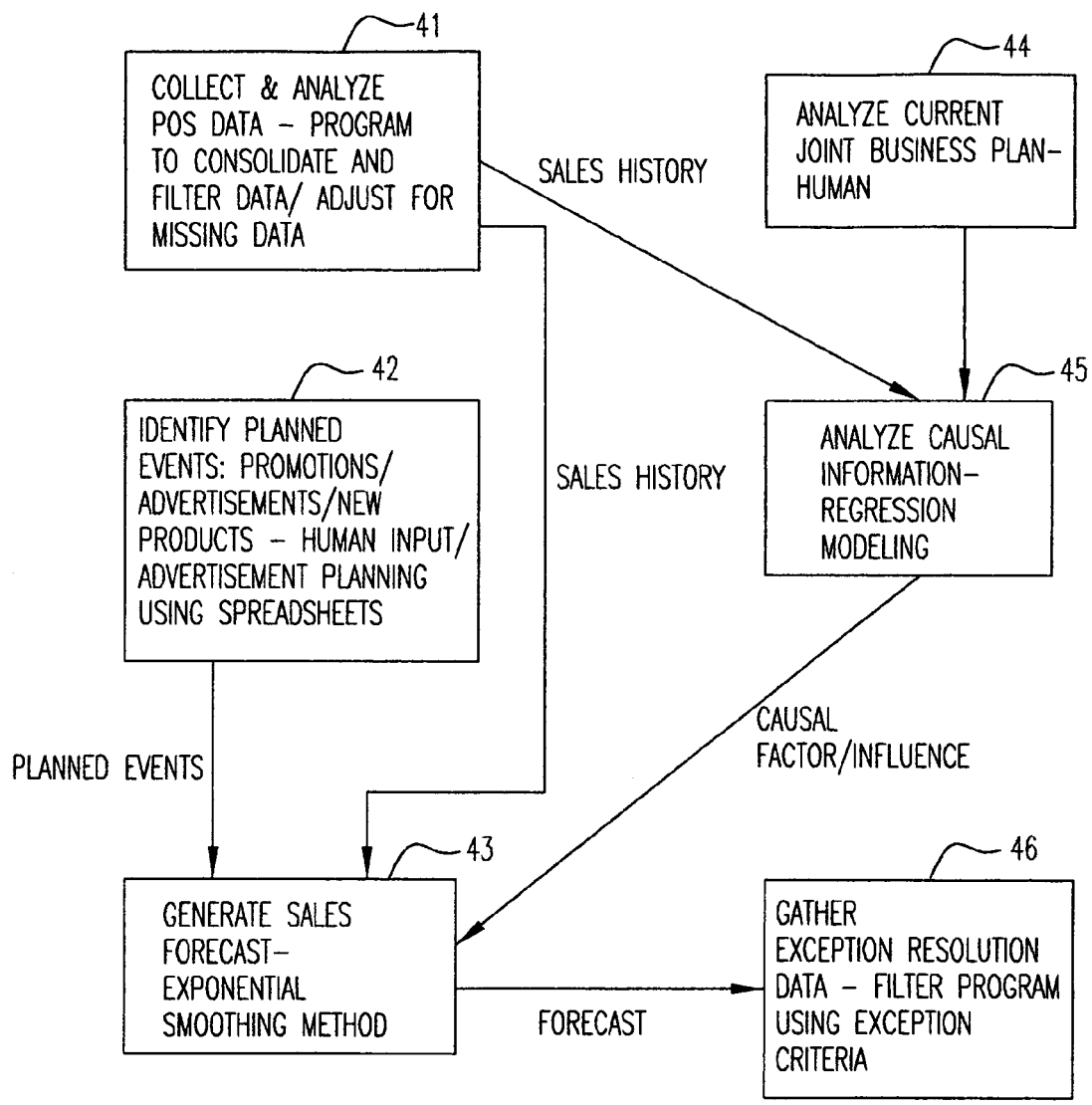
FIG. 4 is a data flow diagram showing the supporting software systems of the sales forecasting process shown in FIG. 2.

FIG. 4, which is similar to FIG. 2, shows how the forecasting process is supported by various application software components. Some typical choices for each of the process steps (blocks 41 to 46 in FIG. 4) are marked in italics inside each process block. Referring to FIG. 4, block 41 is supported by a program to consolidate POS transaction data into weekly sales by product, filter out data that are out of range (erroneous data), adjust the weekly sales total if the data for any day of the week are missing (due to say a system breakdown). Block 42 is supported by a standard spreadsheet containing the event plan that is the result of human input. Block 43 is supported by a program to perform time series forecasting of product sales. The program first deseasonalizes the historical sales data using a set of user-specified seasonal indices, then use the simple exponential smoothing method on the deseasonalized sales data to estimate the base sales. The base sales is then adjusted by the seasonal indices and price markdown effects to obtain the sales forecast. Block 45 is supported by a program that uses standard regression analysis to estimate the effect of causal factors on sales. Block 46 is supported by a program to detect exceptional forecasts produced by block 43, based on the exception criteria previously agreed to by the retailer and the manufacturer. The choices for the supporting systems represent a somewhat simplified but very typical scenario in a retail supply chain.

Figure 5:
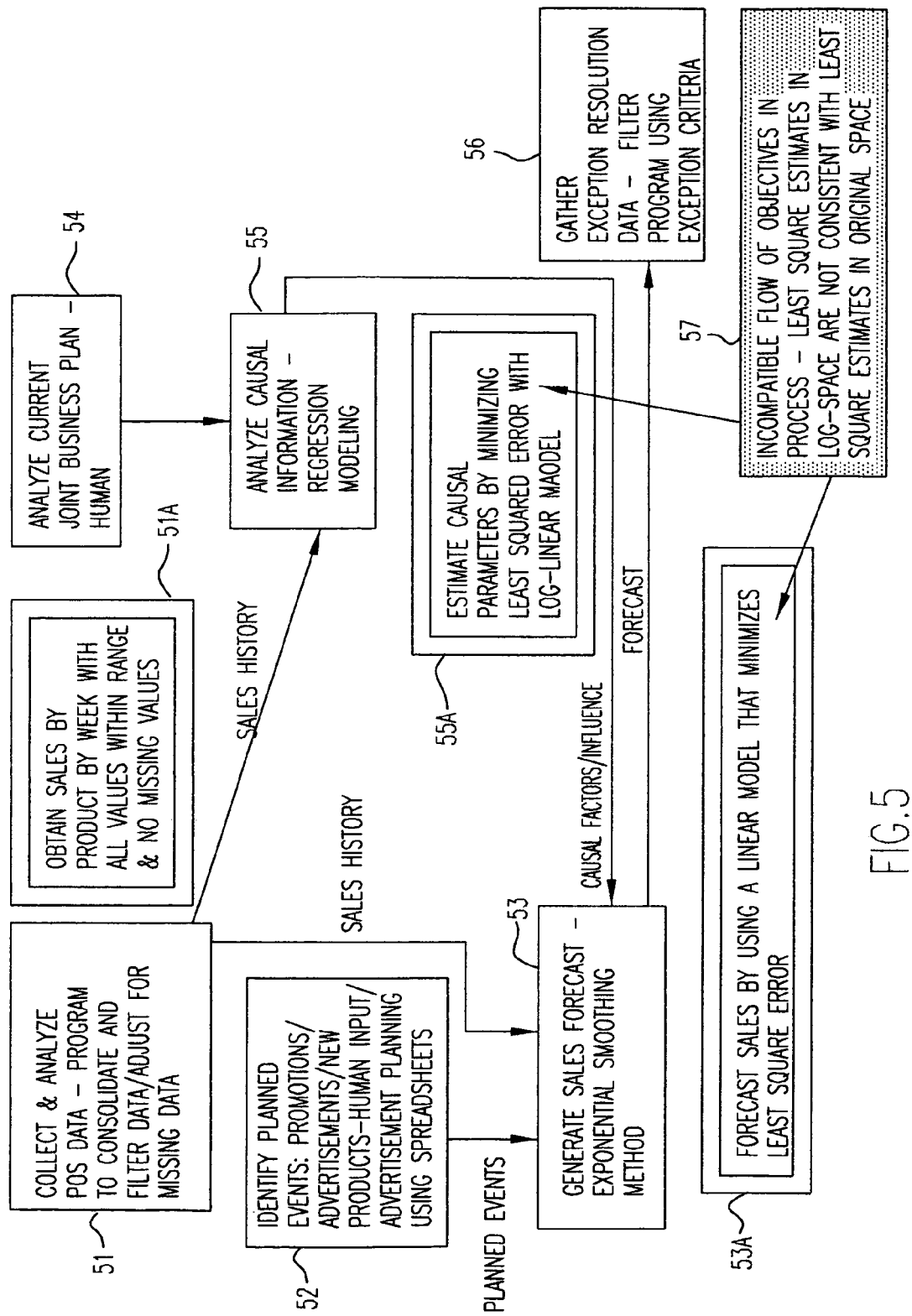
FIG. 5 is a data flow diagram showing the objectives of the individual steps in the sales forecasting process shown in FIG. 2.
Figure 6:
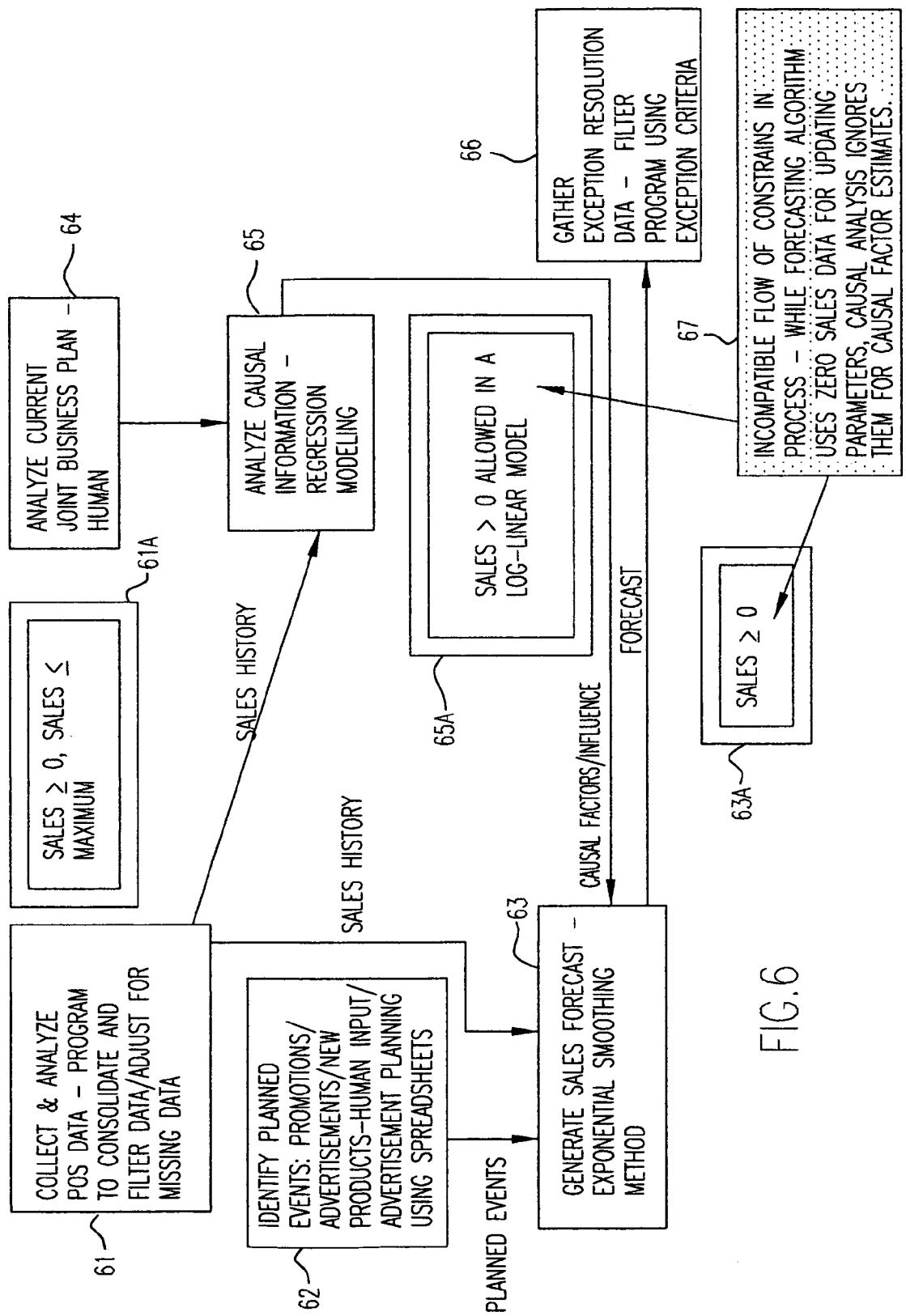
FIG. 6 is a data flow diagram showing the constraints of the individual steps in the sales forecasting process shown in FIG. 2.
Figure 7:
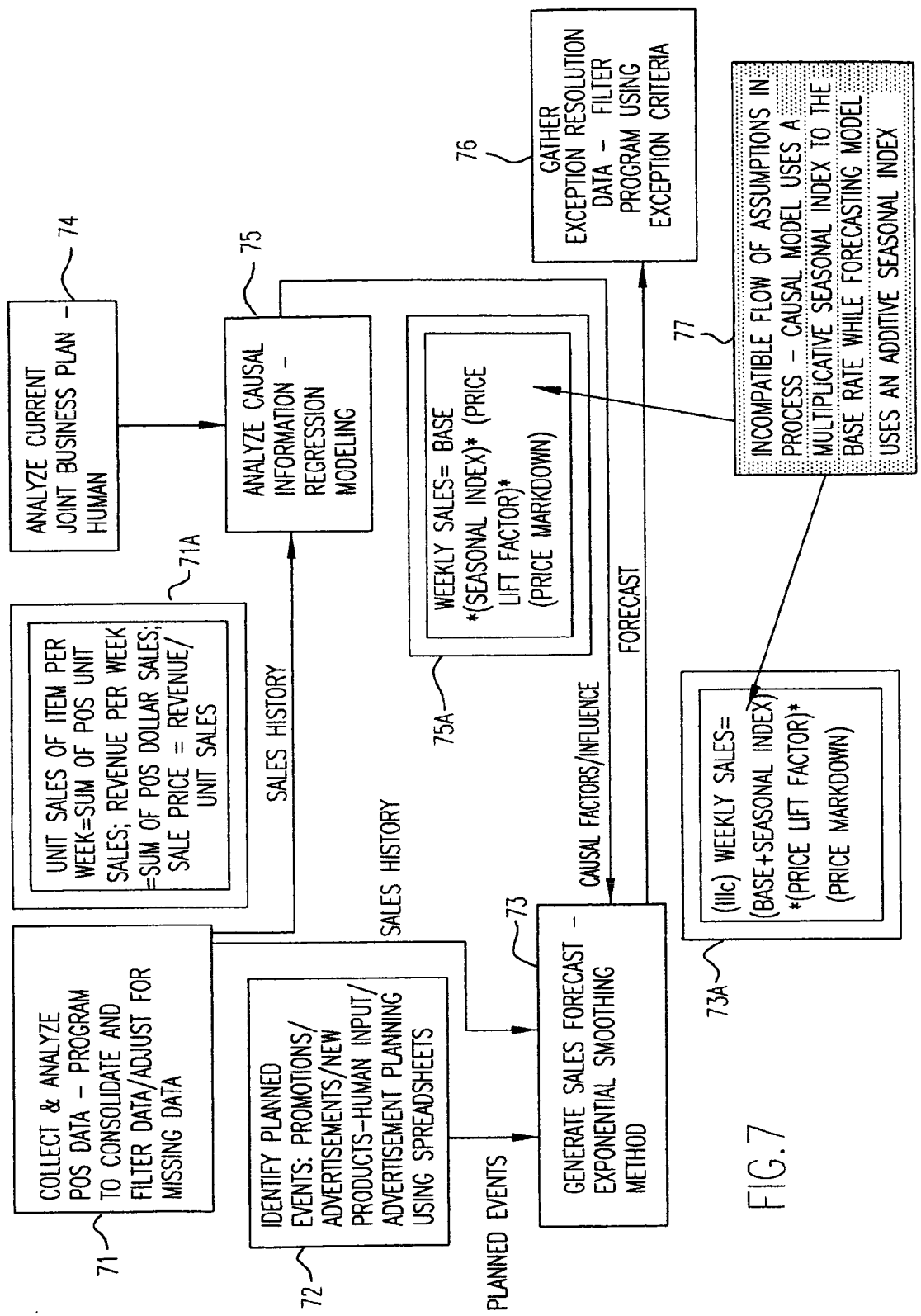
FIG. 7 is a data flow diagram showing the assumptions of the individual steps in the sales forecasting process shown in FIG. 2.

Next in FIGS. 5, 6 and 7, the objectives, constraints, and assumptions in that are implicit in the supporting systems are illustrated along with the process blocks. Note that in actual implementation, the representation of objectives, constraints, and assumptions will be made using the BDML tags as described above, based on the specifications of the software systems. Here we have limited ourselves to a verbal description for the purpose of illustrating the workings of the logic processor.

In FIG. 5, blocks 51A, 53A and 55A contain the objective for blocks 51, 53 and 55, respectively. Blocks 51 to 56 are identical to blocks 41 to 46 in FIG. 4. The objective for block 51 is to provide the historical unit sales by product by week with the sales figures within a user-specified range (zero to a conceivable maximum) and with no missing values in the entire history (see block 51A). The objective for block 53 is to provide a sales forecast that minimizes the weighted least square error for a linear model over the historical horizon. (See block 53A). This is the objective for the standard simple exponential smoothing model. See, e.g., Lynwood A. Johnson and Douglas C. Montgomery, *Operations Research in Production Planning, Scheduling, and Inventory Control*, John Wiley, 1974.) The objective for block 55 is to estimate the effect of causal factors in the form of coefficients in a log-linear model, such as price markdown, that minimizes the least squared error for the model over the historical horizon. (See block 55A). Least squared error is the objective for standard linear regression analysis. See, e.g., Norman R. Draper and Harry Smith, *Applied Regression Analysis*, Second edition, John Wiley, 1981. Log-linear models are commonly used for promotions and price mark downs in the marketing trade.)

In FIG. 6, blocks 61A, 63A and 65A contain the constraints for blocks 61, 63 and 65, respectively. Blocks 61 to 66 are identical to blocks 41 to 46 in FIG. 4. The constraints for block 61 are that the historical sales have to be larger than or equal to zero and smaller than or equal to a user-specified maximum. The maximum is a conceivable largest sales number and is there to eliminate erroneous data. (See block 61A.)

The constraint for block 63 is that historical sales have to be larger than or equal to zero in order to be considered by the exponential smoothing model. (See block 63A.) This is a common assumption in standard exponential smoothing models. The constraint for block 65 is that the historical sales have to be strictly larger than zero in order to be considered by the log-linear regression model. (See block 65A.) This assumption is frequently used in practice since it is not possible to take the logarithm of zero.

In FIG. 7, blocks 71A, 73A and 75A contain the assumptions for blocks 71, 73 and 75, respectively. Blocks 71 to 76 are identical to blocks 41 to 46 in FIG. 4. The assumptions for block 71 are (see block 71A):

1. The unit sales by week of a product are simply the sum of the unit sales in all POS transactions of that product.
2. The revenue by week of a product are simply the sum of the dollar sales in all POS transactions of that product.
3. The selling price of the product by week is the average selling price of the product over the week.

The assumptions for block 73 are (see block 73A) that the seasonal index is additive and the price markdown effect (denoted by "price lift factor" in block 73*a*) is multiplicative. The assumptions for block 75 are (see block 75A) that the seasonal index and the price markdown effect are both multiplicative (due to the log-linear model).

In processing the BDML documents by the logic processor 12 (FIG. 1), the first check of consistency is done against the data model. This is a simple check at each process step (i.e., each block) to ensure that all the data required by the block (input data) will be available either as output of the preceding process step or as explicit input by the user to that step. The logic processor 21 then checks for consistency in the flow of objectives, constraints, and assumptions in the direction of the process flow. In FIG. 5, the shaded box 57 shows a result of consistency checking of the objectives and it highlights the mismatch in objectives between process blocks "Analyze Causal Information" (block 55) and "Generate Sales Forecast" (block 53), in that minimizing least squared error in the linear model in block 53 is not consistent with minimizing least squared error in log space in block 55. In FIG. 6, the shaded box 67 shows a result of consistency checking of constraints and it highlights the mismatch in constraints between process blocks "Analyze Causal Information" (block 65) and "Generate Sales Forecast" (block 63), in that block 65 only considers historical sales that are strictly larger than zero while block 63 also considers historical sales data that are zero. In other words, the models estimated by blocks 65 and 63 are based on different sets of data. In FIG. 7, the shaded box 77 shows a result of consistency checking of assumptions and it highlights the mismatch in assumptions between process blocks "Analyze Causal Information" (block 75) and "Generate Sales Forecast" (block 73), in that block 75 uses a multiplicative seasonal model but block 73 uses an additive seasonal model.

In the logic processor 12 (FIG. 1), there are two ways to handle the identical inconsistencies. The user can specify a single process step which serves as a reference for consistency checking. When there is an inconsistency detected, the system assumes that the reference step has the correct objectives, constraints, or assumptions and warns the user of the other process steps that are inconsistent with the reference step.

Alternatively, the objectives at different process steps in a single business process could be different, but could tie in to a multi-objective view at a higher level in a hierarchical relationship. In such cases, the user can use the process step at the higher level to specify an overall objective that captures the multiple goals for the process. The logic processor 12 then checks consistency among process steps at a lower level against that frame of reference.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented system analysis and design method for use in a complex business environment by a set of linked business processes, comprising steps of:
    providing an (eXtensible Markup Language) XML-based BDML (Business Decision Markup Language) framework representing a world view of each of a plurality of business decisions associated with business processes from among the set of linked business processes, the BDML world view including a business objective tag definition for quantitatively representing a business objective, constraints tag definition, assumptions tag definition, data tag definition, and an underlying model tag definition for identifying a business decision mathematical algorithm;
    capturing in the BDML framework a world view of a plurality of business decisions that occur in the set of linked business processes, wherein the capturing includes specifying and documenting each of the plurality of business decisions as a BDML portable document structured according to said XML-based BDML framework, having a business objectives tag quantitatively representing the decision's business objective, constraints tag representing the decision's constraints, assumptions tag representing the decision's assumptions, data tag representing data related to the decision, and an underlying model tag identifying the business decision mathematical algorithm applied in the decision;
    checking for logical consistency between different business decision based on the decision's respective BDML portable documents and their respective said tags.

2. The method of claim 1, further comprising: constructing a BDML knowledge base of business decisions and processes within an organization, based on the BDML documents representing said business decisions.

3. The method of claim 1, further comprising:
    generating a BDML document representing, according to said BDML framework, a functional specification of a business application software system; and generating a BDML document representing, according to said BDML framework, a world view of a technical research paper in the area of business decisions and its findings.

4. The method of claim 1, further comprising providing a BDML processor, wherein said documenting includes forming the BDML documents representing said world view of said business decision to be machine readable by the BDML processor and by human users.

\* \* \* \* \*